United States Patent [19]

Kono

[11] 4,055,154
[45] Oct. 25, 1977

[54] FUEL SUPPLY SYSTEM FOR A ROTARY PISTON ENGINE

[75] Inventor: Toshiyuki Kono, Toyoake, Japan

[73] Assignee: Toyota Jidosha Kogyo Kabushiki Kaisha, Toyota, Japan

[21] Appl. No.: 631,414

[22] Filed: Nov. 12, 1975

[30] Foreign Application Priority Data

Aug. 15, 1975   Japan ................................ 50-99388

[51] Int. Cl.² ............................................. F02B 53/10
[52] U.S. Cl. .............................. 123/8.09; 123/119 LR
[58] Field of Search ................. 123/8.09, 8.11, 8.13, 123/32 EA, 32 ST, 119 R, 198 F, 198 DB

[56] References Cited

U.S. PATENT DOCUMENTS

| | | | |
|---|---|---|---|
| 3,589,344 | 6/1971 | Steinke | 123/8.09 |
| 3,780,707 | 12/1973 | Cole | 123/8.45 X |
| 3,827,237 | 8/1974 | Linder et al. | 60/276 X |
| 3,898,963 | 8/1975 | Iwata et al. | 123/8.09 X |
| 3,910,240 | 10/1975 | Omori et al. | 60/285 X |
| 3,915,126 | 10/1975 | Kishimoto et al. | 123/8.13 |
| 3,982,393 | 9/1976 | Masaki et al. | 60/274 |

Primary Examiner—Carlton R. Croyle
Assistant Examiner—Michael Koczo, Jr.
Attorney, Agent, or Firm—Birch, Stewart, Kolasch and Birch

[57] ABSTRACT

In the stratified combustion rotary piston engine of the Wankel-type, wherein individual combustion chambers are charged with a relatively rich fuel-air mixture and a relatively lean fuel-air mixture or air by first and second intake systems, each system incorporating a fuel injection means, at least one of said fuel injection means being actuated for only selected suction strokes of individual combustion chambers so that the overall air/fuel ratio is altered for the individual combustion chambers.

5 Claims, 3 Drawing Figures

AIR/FUEL RATIO VS EXHAUST GAS CONTENTS IN THE ROTARY PISTON ENGINE

FUEL SUPPLY SYSTEM FOR A ROTARY PISTON ENGINE

BACKGROUND OF THE INVENTION

1. Field of the Invention

The present invention relates to a rotary piston engine and, more particularly, a method of and a device for supplying fuel to a stratified combustion rotary piston engine.

2. Description of the Prior Art

In the so-called Wankel-type rotary piston engine which comprises a casing composed of a rotor housing having a trochoidal inner peripheral surface and side housings which close opposite sides of said rotor housing and a polygonal rotor adapted to rotate eccentrically in said casing with apex portions thereof sliding over said inner peripheral surface, the flame initiated from an ignition plug propagates very swiftly toward the leading side located at the front side of the rotor as seen in the rotational direction of the rotor due to the flow of fuel-air mixture caused by the rotation of the rotor. However, the propagation of the flame toward the trailing side located at the rotationally rear side of the rotor is relatively impeded, whereby there exists the problem that although the fuel-air mixture is favorably combusted in the leading side, the combustion is incomplete in the trailing side thereby lowering the combustion efficiency with the results of increasing the fuel consumption and simultaneously increasing the emission of harmful uncombusted components such as HC and CO in the exhaust gas. In order to solve this problem, I have proposed a rotary piston engine having a first intake port which opens in said trochoidal inner peripheral surface and a second intake port which opens in an inner surface of said side housing at a position advanced from said first intake port with respect to the rotational direction of the rotor. The first intake port is supplied a fuel-air mixture while said second intake port is supplied with only air, thereby providing stratified charging in a manner that the leading side portion of the combustion chamber where the combustion of the fuel-air mixture is relatively easily effected is filled with a relatively rich fuel-air mixture, whereas the trailing side of the chamber where the combustion of fuel-air mixture is difficult to achieve is filled with only air.

In this stratified combustion rotary piston engine, the particular manner of combustion improves the fuel consumption when compared with the conventional rotary piston engine and, simultaneously, contributes to reducing the emission of HC and CO in the exhaust gas. However, since the emission of HC and CO is not completely reduced to zero, it is required that those components remaining in the exhaust gas are processed in a thermal reactor. Since it is required that temperature of the exhaust gas must be above a certain level if an effective operation of the thermal reactor is to be accomplished, the lowering of the exhaust gas temperature in the abovementioned stratified combustion causes the problem that the purifying performance of the thermal reactor is substantially lowered.

Furthermore, although the amount of NOx contained in the exhaust gas of the rotary piston engine is very small when compared with the reciprocating engines so that it meets with the present-day regulations for emission control without any countermeasures being required, it is expected that the regulations regarding exhaust gas will become more severe in the near future and, therefore, the current rotary piston engine will soon violate the regulations with regard to NOx emission.

It is known that generally there exists a relation such as shown in FIG. 1 between the air/fuel ratio and the emission of HC, CO and NOx in the exhaust gas of a gasoline engine. In FIG. 1 the scales for CO, HC and NOx are particularly adapted for the case of the rotary piston engine. As apparent from FIG. 1, the NOx content in the exhaust gas is a maximum when the air/fuel ratio is about 15-16, but and lowers relatively steeply as the air/fuel ratio increases or decreases from the abovementioned value. The present anti-air pollution rotary piston engine employs an air/fuel ratio of about 12-13, whereby the emission of NOx is restricted within an acceptable limit while the HC and CO delivered in this operational condition are eliminated by recombusting in a thermal reactor. However, if, for example, the limit value of 0.25 g/km for NOx, which is expected to be enforced in the near future, is to be satisfied, the NOx content must be lower than 130 ppm. To accomplish this, the air/fuel ratio must be either substantially low, that is, in the order of about 11-12 or, on the contrary, must be relatively high, that is, in the order of about 18-19. If the air/fuel ratio is lowered to the order of about 11-12, the amount of HC and CO substantially increases beyond the limit which can be processed by the present thermal reactor or catalyst. On the other hand, if the air/fuel ratio is increased as high as about 18-19, the ignitability of fuel-air mixture becomes poor thereby causing misfiring and making it difficult to maintain a smooth operation of the engine. In this condition, the CO content is almost zero and, although the amount of HC relatively increases when compared with its minimum value, its absolute value is still acceptable and it is still possible to process the uncombusted components by the present thermal reactor or catalyst.

SUMMARY OF THE INVENTION

The present invention is based upon the consideration regarding the aforementioned relationship between the air/fuel ratio and the emission of HC, CO and NOx and contemplates providing an air-pollution free stratified combustion clean engine which can maintain a smooth operation while supressing the emission of NOx within the limit to satisfy the regulations, simultaneously supressing the emission of HC and CO within the limit to be processed by a thermal reactor or catalyst while maintaining the temperature of the exhaust gas at a high level required for the post processing by the thermal reactor or catalyst.

Accordingly the object of the present invention is to provide a novel system for supplying fuel to the air-pollution free, stratified combustion, clean engine based upon the aforementioned principle.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a device for supplying fuel to a rotary piston engine of the type comprising a casing composed of a rotor housing having a trochoidal inner peripheral surface and side housings which close opposite ends of said rotor housing, and a polygonal rotor adapted to rotate eccentrically in said casing with apex portions thereof sliding over said trochoidal surface while defining a plurality of combustion chambers between said trochoidal surface and individual side walls of said polygonal rotor. The casing has first and second intake ports which open to the inner wall of said casing, said second port being positioned as advanced in the rotational direction of said rotor relative to said first port. First and second intake systems including first and second fuel injection means are provided for supplying selected one of fuel-air mixture and air through said first and second intake ports. According to the present invention, a control means is provided for controlling said fuel injection means in a manner so that said first fuel injection means is actuated for every suction stroke of said plurality of combustion chambers while said second fuel injection means is actuated for only selected suction strokes of said plurality of combustion chambers.

By employing the abovementioned fuel supply device, when said first fuel injection means alone is operated to supply a fuel-air mixture through said first port while only air is supplied through said second port, the overall air/fuel ratio, i.e., the ratio of the total amount of air supplied through said first and second ports to the amount of fuel supplied by said first fuel injection means, is adjusted to be in the order of about 18-19 thereby providing a relatively lean fuel-air mixture in a selected suction stroke of the engine. For another selected suction stroke, both of said first and second fuel injection means are actuated to provide a fuel-air mixture even from said second port in addition to the fuel-air mixture supplied through said first port, the amount of fuel injection from said first and second fuel injection means being adjusted to provide the overall air/fuel ratio in the order of about 11-12 thereby effecting combustion by a relatively rich fuel-air mixture. Thus, by alternating these two kinds of suction strokes by actuating only said first fuel injection means and by actuating both said first and second fuel injection means, the exhaust gas in the combustion of the rich fuel-air mixture and the lean fuel-air mixture individually shows a relatively low value of NOx. With regard to CO, the emission from the combustion chamber which operates with the relatively rich fuel-air mixture is relatively high when compared with the conventional stratified combustion rotary piston engine, while the emission of CO from the combustion chamber which operates with the lean fuel-air mixture is substantially zero, thus resulting in a reduction on the basis of the mean value of CO emission. With regard to HC, the emission increases in an amount which, however, is relatively small in its absolute value. Therefore, the total amount of the uncombusted component is limited within a range which can be processed by the conventional thermal reactor.

If a relatively lean fuel-air mixture of air/fuel ratio in the order of about 18-19 alone is to be combusted, misfiring will occur due to poor ignitability of the fuel-air mixture thereby causing rough operation of the engine. In the present invention, however, the rotation of the rotor is stably maintained by the combustion of the relatively rich fuel-air mixture performed in the preceding combustion chambers. Thus, the operation of the engine is, on a whole, stably maintained. Furthermore, according to the present invention, the stratified combustion effectively avoids misfiring even in the combustion by a relatively lean fuel-air mixture of an air/fuel ratio higher than 18 and contributes to maintaining a more stable operation of the engine when compared with the conventional non-stratified combustion rotary piston engine. Furthermore, because a relatively high exhaust gas temperature is obtained in the phase of the rich combustion in the alternate combustion of the rich and the lean fuel-air mixture, even when the overall air/fuel ratio is relatively high, recombustion of the uncombusted components in the thermal reactor is effected in a high efficiency. By employing fuel in the injecting manner by employing the abovementioned first and second fuel injection means, the amount of fuel supplied to individual combustion chambers can be controlled with a very high responsiveness by regulating the time for injecting fuel so that the amount of fuel is altered in high precision for every combustion chamber which successively performs the suction stroke, thereby effecting the abovementioned alternating combustion between the rich and the lean fuel combustion.

According to the basic concept of stratified combustion, the fuel-air mixture supplied through said second intake port should preferably be leaner than that supplied through said first port. By this arrangement, favorable stratified combustion is effected throughout the entire combustion strokes of the rotary piston engine.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
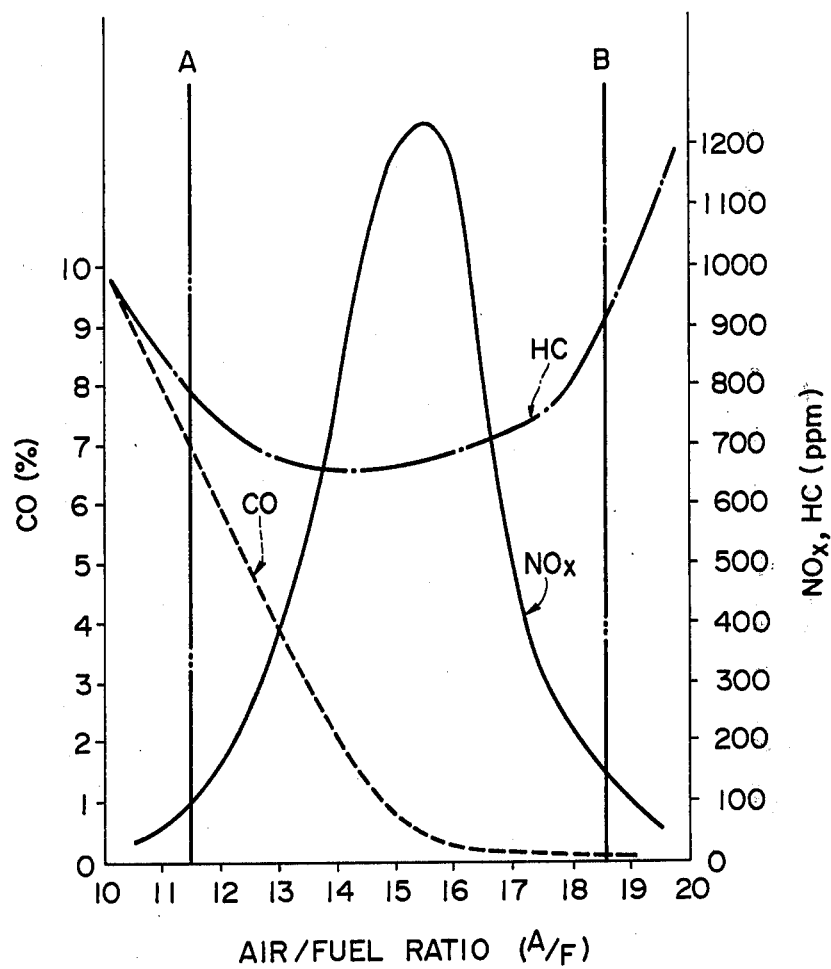
FIG. 1 is a graph showing the emission of CO, HC and NOx in the exhaust of a gasoline engine with respect to air/fuel ratio, the graph being particularly scaled for the case of the rotary piston engine.
Figure 2:
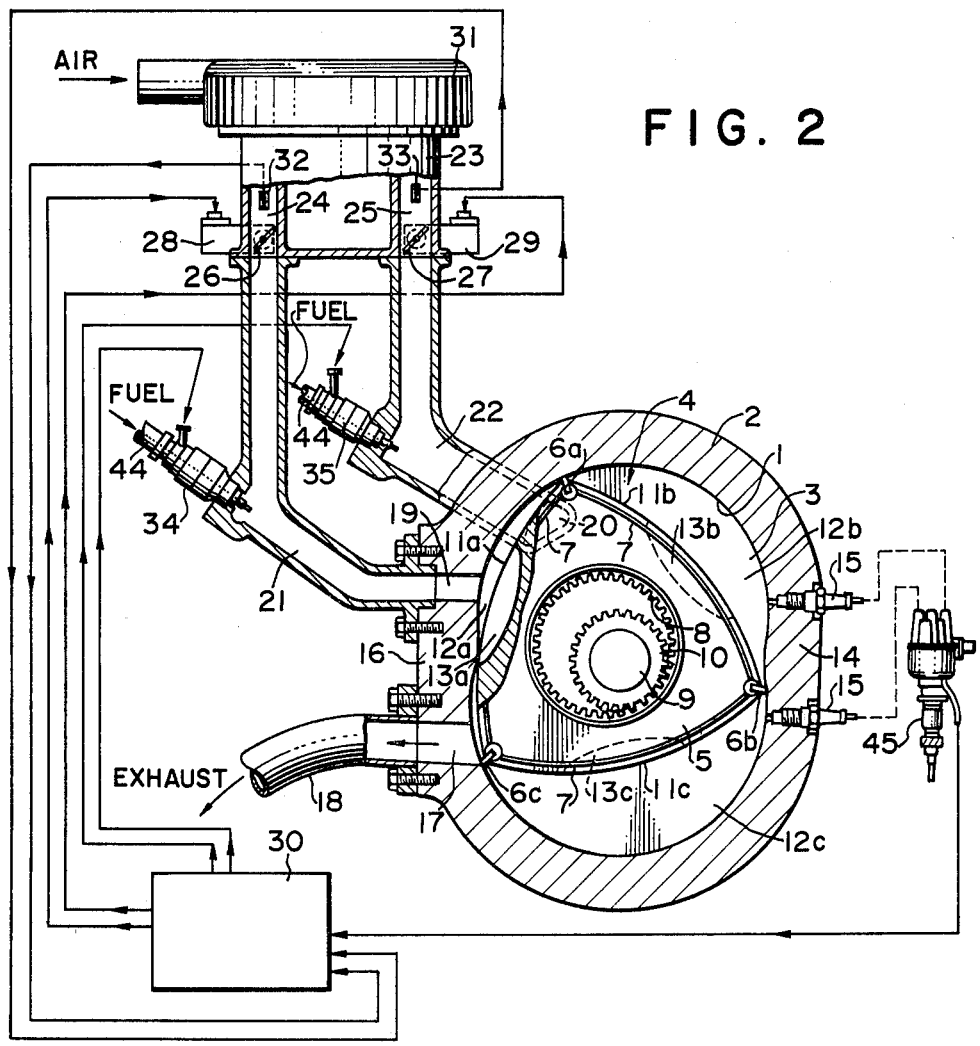
FIG. 2 is a diagrammatical view showing the basic constitution of the rotary piston engine incorporating the fuel supply system according to the present invention; and, FIG. 3 is a longitudinal section of an example of a fuel injection means employable in the present invention.

Referring to FIG. 2, a rotor housing 2 having a trochoidal inner peripheral surface 1 is assembled with side housings 4 each having a flat inside surface 3 to provide a casing, for housing a triangular rotor 5. The rotor is provided to be rotatable eccentrically around an eccentric shaft 9 with its apex seals 6a-6c provided at its three apex portions contacting said trochoidal surface. Side seals 7 are provided along three side edges and simultaneously contact said inner surface 3 of the side housing under the meshing of an internal gear 8 thereof with a fixed gear 10 of the eccentric shaft 9. The rotor 5 in the casing defines three combustion chambers 12a-12c by its three arcuate peripheral flanks 11a-11c cooperating with said trochoidal inner peripheral surface. For the three combustion chambers, said three arcuate flanks 11a-11c provide recesses 13a-13c at a central portion thereof, respectively. Adjacent a short axis portion 14 of the trochoidal inner peripheral surface 1 of the rotor housing 2 are provided two ignition plugs 15, while adjacent another short axis portion 16, located rearward as seen in the rotational direction of the rotor, an exhaust port 17 is provided, said port being connected with an exhaust manifold 18. Adjacent the short axis portion 16, located forward as seen in the rotational direction of the rotor, a peripheral intake port 19 is provided and, as located further advanced therefrom in the rotational direction of the rotor, a side intake port 20 is provided to open in the side housing 4. In this case, the peripheral intake port 19 provides a relatively small constant opening area for a range of rotational angle of the eccentric shaft extending before and after of the top dead center while, in contrast, the side intake port 20 provides an opening area which varies in a manner so as to steeply increase after the rotational angle of the eccentric shaft has traversed the top dead center, then then reaching its maximum which is several times larger than the opening area of the peripheral intake port about at the time when the peripheral intake port is closed and, thereafter, steeply decreasing toward zero.

The ports 19 and 20 are connected with first and second intake manifolds 21 and 22, respectively, these intake manifolds being connected at their inlet ends to a throttle body 23. The throttle body 23 is formed as a duplex throttle body having a first air supply passage 24 communicating with the intake manifold 21 and a second air supply passage 25 communicating with the intake manifold 22. The air supply passages 24 and 25 are provided with throttle valves 26 and 27, respectively, which are adapted to be driven independently from each other by individual actuators 28 and 29. The actuators may be an optional link mechanism adapted to be mechanically driven by an accelerating pedal or an electrical device employing a small electric motor electrically controlled by a computer 30 according to operation of an accelerating pedal. An air cleaner 31 is mounted at the entrance to the throttle body 23 and in the individual air passages 24 and 25 connected to the air cleaner are provided air flow sensors 32 and 33. These air flow sensors may be a well known heat wire sensor employing a thermal sensitive resistor element or a flapper sensor employing a flow sensitive flapper element adapted to dispatch an electric signal according to the air flow detected thereby. The electric signals from these sensors are supplied to the computer 30. Note, the electric computer 30 may, for example, be a slight modification of the electronic system disclosed in FIG. 7 of U.S. Pat. No. 3,827,237.

Figure 3:
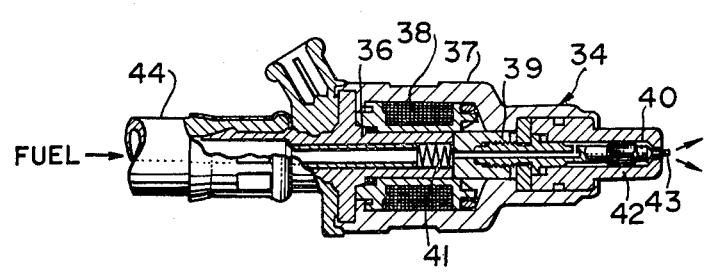

The first and second air supply passages 21 and 22 are provided with first and second fuel injection means 34 and 35, each being adapted to inject fuel into the respective passages according to an injection signal supplied from the computer 30. The first fuel injection means 34 makes an injection of a predetermined amount of fuel for every suction stroke of all combustion chambers, while said second fuel injection means 35 makes an injection of a predetermined amount of fuel for selected suction strokes such as, for example, every other suction stroke, under the control of the computer 30. The first and second fuel injection means 34 and 35 may, for example, be an electro-magnetic fuel injection means as shown in FIG. 3. The fuel injection means shown in FIG. 3 comprises a body 36 and a solenoid casing 37 which encloses the body 36 while supporting therein a solenoid 38, said solenoid being adapted to draw a plunger 39 when it is energized by a driving pulse current supplied from the computer 30, thereby shifting a needle valve body 40 mounted to the plunger toward a valve opening position against the action of a compression coil spring 41, thus opening an injection opening 43 provided at a tip end of a nozzle casing 42 mounted at the tip end portion of the solenoid casing 37. A fuel supply tube 44 is connected to the rear end of the body 36 so that the fuel supplied through said fuel supply tube flows through a central bore formed in the body 36, the plunger 39 and a portion of the needle valve body 40 as shown by arrows in the figure to be injected from the injection opening 43 toward the air supply passage 21 or 22. The amount of fuel injected in the abovementioned manner is regulated by the time in which the needle valve is opened, i.e, the time in which the solenoid 38 is energized, because the stroke of the needle valve is constant.

The computer 30 is supplied with a timing signal for indicating the time for making fuel injection from a distributor 45 which may be a conventional type provided in the conventional rotary piston engine. The computer 30 sends the ignition signal to said first fuel injection means 34 every time it receives the timing signal from the distributor 45 while the computer sends the ignition signal to said second fuel injection means 35 in response to, for example, every other timing signal received from the distributor 45, wherein the injection signal may be in the form of pulses each having a length determined by the computer based upon the suction air flow detected by the air flow sensors 32 and 33. Thus, for example, when the combustion chamber 12a begins to perform the suction stroke, the computer 30 sends the injection signal only to the first fuel injection means 34 depending upon the timing signal received from the distributor 45, whereby the first fuel injection means makes an injection of a predetermined amount of fuel thereby providing the fuel-air mixture to be supplied through the peripheral intake port 19 to the combustion chamber 12a. In this stroke, only air is supplied through the side intake port 20. As a result, the overall air/fuel ratio in the combustion chamber 12a is a relatively high value in the order of 18–19.

When the rotor 5 has rotated so far that the next combustion chamber 12c initiates to perform the suction stroke, the computer 30 sends the ignition signal to both the first and second injection means 34 and 35 according to the timing signal received from the distributor 45, whereby the fuel injection means 34 and 35 individually make an injection of fuel of an amount determined according to the amount of suction air thereby supplying a fuel-air mixture through both the peripheral intake port 19 and the side intake port 20 toward the combustion chamber 12c. Therefore, the amount of fuel in the combustion chamber 12c is increased by the amount of fuel injected from the second fuel injection means 35 thereby providing a rich combustion of a fuel-air mixture having an overall air/fuel ratio in the order of about 11–12. In the further rotation of the rotor, for each combustion chamber which performs the suction stroke, a relatively rich or lean fuel-air mixture is supplied alternately in the abovementioned manner to accomplish the stratified combustion, thereby supressing the emission of NOx below a required limit while maintaining the emission of CO and HC at a level which can be processed by recombustion in the conventional thermal reactor.

The order of repetition of charging the relatively rich and lean fuel-air mixtures need not be an alternation of one charge of each kind but may be determined so that one charge of a relatively rich fuel-air mixture can be followed by two or three charges of the relatively lean fuel-air mixture.

Furthermore, although the present invention has been illustrated and described with reference to the embodiment having a peripheral intake port and side intake port, the latter being positioned as advanced from the former as seen in the rotational direction of the rotor, the present invention is not limited to this structure and it is also applicable to the rotary piston engine which operates with two peripheral intake ports or two side intake ports.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A rotary piston engine comprising a casing composed of a rotor housing having a trochoidal inner peripheral surface and side housings which close opposite ends of said rotor housing, a polygonal rotor adapted to rotate eccentrically in said casing with apex portions thereof sliding over said trochoidal surface thereby defining a plurality of combustion chambers between said trochoidal surface and individual flanks of said polygonal rotor, said casing having first and second intake ports which open in the inner wall of said casing, said second port being positioned so as to be advanced in the rotational direction of said rotor relative to said first port, first and second intake systems connected to said first and second ports, respectively, first and second fuel injection means for injecting fuel into said first and second intake systems, respectively, first and second means to detect intake air flow rate in said first and second intake systems and to dispatch first and second flow rate signals showing the intake air flow rate in said first and second intake systems, respectively, means to detect the rotation of said rotor and dispatch a timing signal showing the rotational timing of said rotor, a computer which operates depending upon said first and second flow rate signals and said timing signal to produce a first and second series of fuel injection signals for actuating said first and second fuel injection means in a manner that the duration and timing of the fuel injection in said first intake system are determined by said first flow rate signal and said timing signal, respectively, that the duration and timing of the fuel injection in said second intake system are determined by said second flow rate signal and said timing signal, respectively, and that said first fuel injection means is actuated for every sequential suction strokes performed by said plurality of combustion chambers while said second fuel injection means is actuated for only cyclically selected ones of said sequential suction strokes performed by said plurality of combustion chambers.

2. The engine of claim 1, wherein said fuel injection means are the electromagnetic type and are adapted to make the fuel injection while they receive an electric pulse, and said first and second series of fuel injection signals are electric pulses.

3. The engine of claim 1, wherein said first and second means for dispatching said first and second flow rate signals are air flow sensors provided in said first and second intake systems, respectively.

4. The engine of claim 1, wherein said means to dispatch said timing signal is a distributor.

5. The engine of claim 1, wherein said computer controls said first and second fuel injection means so that when said first and second fuel injection means are operated for a particular combustion chamber, the fuel-air mixture is about an 11–12 air/fuel ratio and when said first injection means only is operated for a particular combustion chamber, the fuel-air mixture is about an 18–19 air/fuel ratio.

* * * * *